Patented Aug. 3, 1954

2,685,553

UNITED STATES PATENT OFFICE 2,685,553

CEMENT COATED TABLETS

Richard H. Carroll, Old Chatham, and Daniel J. Spadaro, Albany, N. Y., assignors to Winthrop-Stearns Inc., New York, N. Y., a corporation of Delaware No Drawing. Application March 30, 1951, Serial No. 218,518

5 Claims. (Cl. 167—82)

This invention relates to coated medicaments suited for peroral administration.

In particular, our invention relates to coated medicament tablets having high structural strength and which are substantially disintegrated by the secretions of the stomach and the intestines after contact therewith during a sufficient period of time.

It is a primary object of our invention to provide means for perorally administering medicaments which have an objectionable action in the mouth. Such medicaments which have an undesirable effect on the oral mucous membranes include, for example, internal antiseptic and antiparasitic agents, for instance of the phenolic type which have a corrosive action on the sensitive membranes of the mouth; digestive enzymes; therapeutic or diagnostic dyes, such as gentian violet, which stain or discolor the mouth or teeth; and substances having an unpleasant odor or taste.

We have now succeeded in preparing coated medicaments of high structural strength which, when perorally administered, pass through the oral cavity in substantially intact form, i. e. without release of the medicament, despite salivary action and intentional or inadvertent biting, and which release the medicament by disintegration of the coating under the influence of the secretions of the stomach. Our invention comprises these new coated medicaments obtained by coating a medicinal tablet with a hydraulic cement. We employ the term "hydraulic cement" in its commonly accepted sense, that is, to designate the calcareous-argillaceous cements which, when mixed with water to form a paste, finally cohere or set to stone hardness. Specifically, these cements include, for example, Portland cement, hydraulic lime, natural rock cement, and pozzuolana or slag cement.

The water-set hydraulic cement coating gives to the tablet a hard, strong coating, the strength of which can be adjusted easily within rather wide limits by varying the thickness of the coating. The time required for disintegration of the coated tablet thus obtained depends on the thickness of the cement layer, and thus the disintegration time can also be conveniently adjusted as desired. The strength of a given thickness of the cement coating depends somewhat on the character of the tablet to which the cement coating is applied. Thus, a dense, non-brittle tablet requires a cement coat of lesser thickness for adequate strength to resist crushing than is required when the cement coating is applied to a brittle tablet. It will be appreciated that the finished cement-coated tablet should be small enough to be swallowed without undue discomfort, and thus the maximum size of the tablet to be coated with the cement will vary according to the thickness of the cement coat required to impart sufficient structural strength to the tablet to resist biting or chewing. In general, we have found that a hydraulic cement coating having a thickness in the approximate range of 0.75–1.5 mm. is satisfactory, both as to strength in resisting chewing or biting action, and as to disintegration time in aqueous media such as gastric fluid.

The tablets employed in carrying out our invention can be any of the conventional products of the tablet-making art, which contain either one or more medicinal ingredients, together with, in many instances, various binders, excipients, etc. These tablets can be either uncoated or, preferably, can have one or more under-coatings of sugar, shellac, talcum, gelatin, starch, or the like. We have discovered that the hydraulic cement can be applied to the tablets according to the usual coating procedures. The tablets are moistened with a syrup containing acacia or similar adhesive gum such as conventionally employed in tablet coating, and then sprinkled with the hydraulic cement powder and rotated until dry. The application of the hydraulic cement in this manner, which of course forms a very thin coat of the cement on the tablet, is repeated until the proper number of coats have been laid down to produce the desired thickness of coating. Advantageously, the coated tablets are finally given one or more conventional finishing coats of shellac, gelatin, sugar, etc. and polished.

It will be appreciated of course that the completed water-set hydraulic cement coat is not a single thickness of cement laid down in a single operation, but rather is a multishelled structure laid down, as described above, by the procedures conventional in the tablet coating art. It is believed that the disintegration of the cement coat of our tablets by aqueous media such as gastric and intestinal fluids proceeds by partial dissolution or pitting, and resultant structural collapse, of successive layers of the cement coat until the medicament core is released. Although our cement-coated tablets can be eventually disintegrated by contact with saliva, the cement coat remains substantially unaffected by the salivary fluid during the short period of time involved in oral administration of the tablets, and even when retained within the mouth for several minutes the medicament is not released into the mouth.

Our invention is illustrated by the following example without, however, being limited thereto.

Example

The following procedure was employed to prepare cement coated tablets containing 1.5 grains of hexylresorcinol.

Eighty-one parts by weight of hexylresorcinol and nineteen parts by weight of a filler or absorbent such as aluminum hydroxide were thoroughly mixed and then the mixture was granulated with a mixture of 80% ethyl alcohol and 20% water. The granulation thus obtained was dried at reduced pressure without application of heat. The dry material was then ground to a number 12 mesh size, slugged several times, and finally gorund to a number 14 mesh size. The ground mixture was then compressed, using a ¼-inch deep concave punch, to produce 3780 tablets per pound, each tablet weighing 120 mg.

The tablets were first coated with eighteen coats of sucrose using a 70% solution of sucrose, and were then sealed with shellac and dusted with two coats of terra alba. These tablets were coated with Portland cement by moistening with 40% sucrose syrup containing 14% acacia, and dusting with dry, pulverized Portland cement and then rolling until thoroughly dry. This procedure of moistening with sucrose-acacia syrup, dusting with Portland cement, and rolling was repeated until eighteen coatings were applied, thereby giving to each tablet a cement coat having a thickness of approximately 1 mm. It is advantageous, especially during the application of the first few coatings of the cement, to allow at least several hours to elapse between each coating in order to ensure proper setting of the cement, when maximum strength of the cement coating is desired.

The cement coated tablets were given one coat of gelatin using a 2.3% solution of gelatin and then coated with sucrose solution and polished.

After cement coated tablets obtained in the above manner were allowed to set for several hours, they were strong enough to resist breaking in the mouth due to biting, and retained the cement coating in artificial gastric fluid (one-tenth normal aqueous solution of hydrochloric acid containing pepsin) for about twelve minutes. The disintegration time for the entire tablet in this solution was found to be about 50–60 minutes. In artificial intestinal fluid, the cement coating was removed in about seventeen minutes, and the entire tablet disintegrated in 70–80 minutes. When tested with a hardness tester, it was found that these tablets required a pressure on the order of 11–15 kg. to crush them.

These cement coated hexylresorcinol tablets were employed clinically by oral administration to patients infected with *Ascaris lumbricoides*.

When administered in this manner, the tablets did not disintegrate or fracture in the mouth when bitten upon or chewed, and the clinical response showed that the medicament was subsequently released in the digestive tract.

In the same fashion as described above, tablets of other medicaments such as gentian violet, quinine, garlic powder, etc. can be coated with a hydraulic cement to produce coated tablets of high structural strength.

We claim:

1. A medicinal tablet having high structural strength including a core comprising the medicament, and a coating exterior thereto comprised essentially of a multiplicity of thin, superimposed layers of a water-set hydraulic cement.

2. A medicinal tablet having high structural strength including a core comprising the medicament, and a coating exterior thereto comprised essentially of a multiplicity of thin, superimposed layers of water-set Portland cement.

3. A medicinal tablet having high structural strength including a core comprising the medicament, and a coating exterior thereto comprised essentially of a multiplicity of thin, superimposed layers of a water-set hydraulic cement, said coating of water-set hydraulic cement having a thickness of 0.75–1.5 mm.

4. A medicinal tablet having high structural strength including a core comprising hexylresorcinol, and a coating exterior thereto comprised essentially of a multiplicity of thin, superimposed layers of a water-set hydraulic cement.

5. A medicinal tablet having high structural strength including a core comprising a mixture of hexylresorcinol and aluminum hydroxide, and a coating exterior thereto comprised essentially of a multiplicity of thin, superimposed layers of a water-set hydraulic cement.

References Cited in the file of this patent

UNITED STATES PATENTS

| Number | Name | Date |
|---|---|---|
| 672,672 | Green | Apr. 23, 1901 |
| 721,633 | Eaton | Feb. 24, 1903 |
| 2,146,867 | Welin | Feb. 14, 1939 |
| 2,155,444 | Pittenger | Apr. 25, 1939 |
| 2,262,087 | Bartlett | Nov. 11, 1941 |

FOREIGN PATENTS

| Number | Country | Date |
|---|---|---|
| 493,934 | Great Britain | Dec. 14, 1937 |
| 228,940 | Great Britain | June 9, 1926 |

OTHER REFERENCES

Drug and Cosmetic Ind., December 1950, pages 776, 777, 864 and 865.